(12) United States Patent
Tang et al.

(10) Patent No.: US 12,355,584 B2
(45) Date of Patent: Jul. 8, 2025

(54) MULTIFUNCTION CONTROL MODULE AND CORRESPONDING METHOD

(71) Applicant: eMoMo Technology Co., Ltd., Shenzhen (CN)

(72) Inventors: Wenji Tang, Shenzhen (CN); Jingzhi Chen, Shenzhen (CN); Dasheng Hu, Dao (CN); Wei Zhou, Wuhan (CN); Zaigui Yang, Xiushan (CN); Shunde Yang, Suizhou (CN)

(73) Assignee: eMoMo Technology Co., Ltd., Shenzhen (CN)

( * ) Notice: Subject to any disclaimer, the term of this patent is extended or adjusted under 35 U.S.C. 154(b) by 827 days.

(21) Appl. No.: 17/162,887

(22) Filed: Jan. 29, 2021

(65) Prior Publication Data

US 2021/0328823 A1    Oct. 21, 2021

Related U.S. Application Data

(63) Continuation-in-part of application No. 29/731,725, filed on Apr. 17, 2020.

(30) Foreign Application Priority Data

Apr. 26, 2020   (CN) .......................... 202010337400.7

(51) Int. Cl.
*H04L 12/28*   (2006.01)
*A47B 37/00*   (2006.01)
(Continued)

(52) U.S. Cl.
CPC ............ *H04L 12/282* (2013.01); *A47B 37/00* (2013.01); *A47G 23/0225* (2013.01);
(Continued)

(58) Field of Classification Search
CPC ........... H04L 12/282; H04L 2012/2841; A47B 37/00; A47B 2200/0001; A47B 2200/008; A47G 23/0225; H02J 7/0044; G08C 17/02
(Continued)

(56) References Cited

U.S. PATENT DOCUMENTS 8,816,636 B2   8/2014  Shinde et al.
9,089,221 B2   7/2015  Stangl et al.
(Continued)

FOREIGN PATENT DOCUMENTS

JP    2013103533 A  *  5/2013

OTHER PUBLICATIONS

Emomo Technologies Co. Ltd, I-Table 406, Nov. 25, 2019, 4 pgs., http://www.emomotech.com/en/product/77235171.html.
(Continued)

*Primary Examiner* — Mohammad Ali
*Assistant Examiner* — Joshua T Sanders
(74) *Attorney, Agent, or Firm* — Womble Bond Dickinson (US) LLP

(57) ABSTRACT

A multifunction control module including a housing having a flat tabletop surface on an upper side and a channel defined by a sidewall extending downwardly from an opening through the flat tabletop surface. A movable section may be positioned within the channel and movable within the channel between a first position forming a part of the flat tabletop surface and a second position below the flat tabletop surface. A drive module may control the movement of the moveable section between the first position and the second position, and a position detection module may determine a position of the movable section.

15 Claims, 5 Drawing Sheets

(51) Int. Cl.
*A47G 23/02* (2006.01)
*H02J 7/00* (2006.01)

(52) U.S. Cl.
CPC ..... *H02J 7/0044* (2013.01); *A47B 2200/0001* (2013.01); *A47B 2200/008* (2013.01); *H04L 2012/2841* (2013.01)

(58) Field of Classification Search
USPC .......................................................... 700/19
See application file for complete search history.

(56) References Cited

U.S. PATENT DOCUMENTS

| | | | |
|---|---|---|---|
| 9,379,561 | B2 | 6/2016 | Rejman |
| D817,267 | S | 5/2018 | Vitulli |
| 10,113,791 | B2 | 10/2018 | Wenji et al. |
| D878,290 | S | 3/2020 | Lee |
| D909,968 | S | 2/2021 | Chen |
| D972,503 | S | 12/2022 | Akana et al. |
| D978,077 | S | 2/2023 | Li |
| D1,011,287 | S | 1/2024 | Li |
| D1,011,288 | S | 1/2024 | Li |
| D1,023,920 | S | 4/2024 | Liao |
| D1,024,953 | S | 4/2024 | Shang |
| D1,025,043 | S | 4/2024 | Akana et al. |
| D1,045,787 | S | 10/2024 | Ke |
| 2007/0227918 | A1 | 10/2007 | Ogura et al. |
| 2008/0033610 | A1* | 2/2008 | Engel .................. G06F 1/182 701/1 |
| 2008/0073949 | A1* | 3/2008 | Rozman ............... G08C 17/02 297/188.14 |
| 2009/0288800 | A1 | 11/2009 | Kang et al. |
| 2010/0102063 | A1 | 4/2010 | Kogami et al. |
| 2010/0201201 | A1 | 8/2010 | Mobarhan et al. |
| 2012/0091744 | A1 | 4/2012 | McKnight et al. |
| 2012/0091948 | A1* | 4/2012 | Shinde ............... B60R 11/0235 320/108 |
| 2013/0320689 | A1 | 12/2013 | Hishon et al. |
| 2015/0070738 | A1 | 3/2015 | Itoh |
| 2015/0173519 | A1* | 6/2015 | Stangl .................... B60Q 3/229 361/837 |
| 2016/0282040 | A1* | 9/2016 | Wenji ..................... F25B 21/02 |
| 2017/0258252 | A1 | 9/2017 | Sawada et al. |
| 2018/0029514 | A1 | 2/2018 | Salinas et al. |
| 2019/0283645 | A1* | 9/2019 | Garcia Salgado ...... H02J 50/10 |
| 2019/0359108 | A1* | 11/2019 | Han ........................ B60N 3/002 |
| 2020/0054130 | A1* | 2/2020 | Dash ....................... A47B 31/02 |

OTHER PUBLICATIONS

Examination Report No. 1 issued in Australian Application No. 2021202381 dated Apr. 8, 2022, 3 pages.
Examination Report No. 2 issued in Australian Application No. 2021202381 dated Apr. 6, 2023, 7 pages.
United States Patent and Trademark Office; Ex Parte Quayle Action issued for U. S. Design U.S. Appl. No. 29/731,725; dated May 8, 2025; 10 pages.

* cited by examiner

MULTIFUNCTION CONTROL MODULE AND CORRESPONDING METHOD

CROSS-REFERENCE TO RELATED APPLICATIONS

This application claims priority to CN Application No. 202010337400.7 filed Apr. 26, 2020. This application is a continuation-in-part of and claims priority to U.S. Design patent application Ser. No. 29/731,725 filed Apr. 17, 2020, which claims priority to CN Application No. 201930571612.X filed Oct. 21, 2019. The entire contents of each application listed above are incorporated herein by reference.

BACKGROUND OF THE DISCLOSURE

The disclosure relates generally but without limitation to smart home technology. In an aspect, the exemplary embodiment(s) relate to a multifunction control module that may include a flat tabletop surface which provides various smart home capabilities in addition to providing a cupholder feature.

Various types of control modules are known for controlling various functions of smart home devices, appliances, and furniture. Such control modules may be enabled to wirelessly control smart home features such as lighting, refrigeration, television, audio, and the like.

Further, it is known to integrate a cup holder into various items, such as the arm of a recliner, tabletop or other home appliance. Such integrated cup holders may be difficult or impossible to remove or clean, and often take up surface area when not in use to hold a cup.

In addition, known tabletop surfaces may not meet the needs of the smart home owner. For example, non-functional tabletop surfaces merely carry objects and serve as decoration.

For at least the above reasons, a need exists for an integrated control module that provides the benefits of, e.g., smart home control and other electrical/electronic functionalities, a tabletop surface, and a cupholder, with efficient use of space.

BRIEF DESCRIPTION OF THE EXEMPLARY EMBODIMENTS

In an aspect, the disclosure relates to a multifunction control module. The multifunction control module may include a housing having a flat tabletop surface on an upper side and a channel defined by a sidewall extending downwardly from an opening through the flat tabletop surface. A movable section may be positioned within the channel and moveable within the channel between a first position forming a part of the flat tabletop surface and a second position below the flat tabletop surface.

In an aspect, the disclosure relates to a method for changing a configuration of a provided multifunction control module. The multifunction control may include a housing having a flat tabletop surface on an upper side and a channel defined by a sidewall extending downwardly from an opening through the flat tabletop surface, and a movable section positioned within the channel and moveable within the channel between a first position forming a part of the flat tabletop surface and a second position below the flat tabletop surface. The method may include controlling the movement of the moveable section between the first position and the second position.

In an aspect, the disclosure relates to a multifunction control module. The multifunction control module may include a housing having a flat tabletop surface on an upper side and a channel defined by a sidewall extending downwardly from an opening through the flat tabletop surface. A movable section may be positioned within the channel and movable within the channel between a first position forming a part of the flat tabletop surface and a second position below the flat tabletop surface. The multifunction control module may have a control circuit driver module programmed for controlling the movable section.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Figure 1:
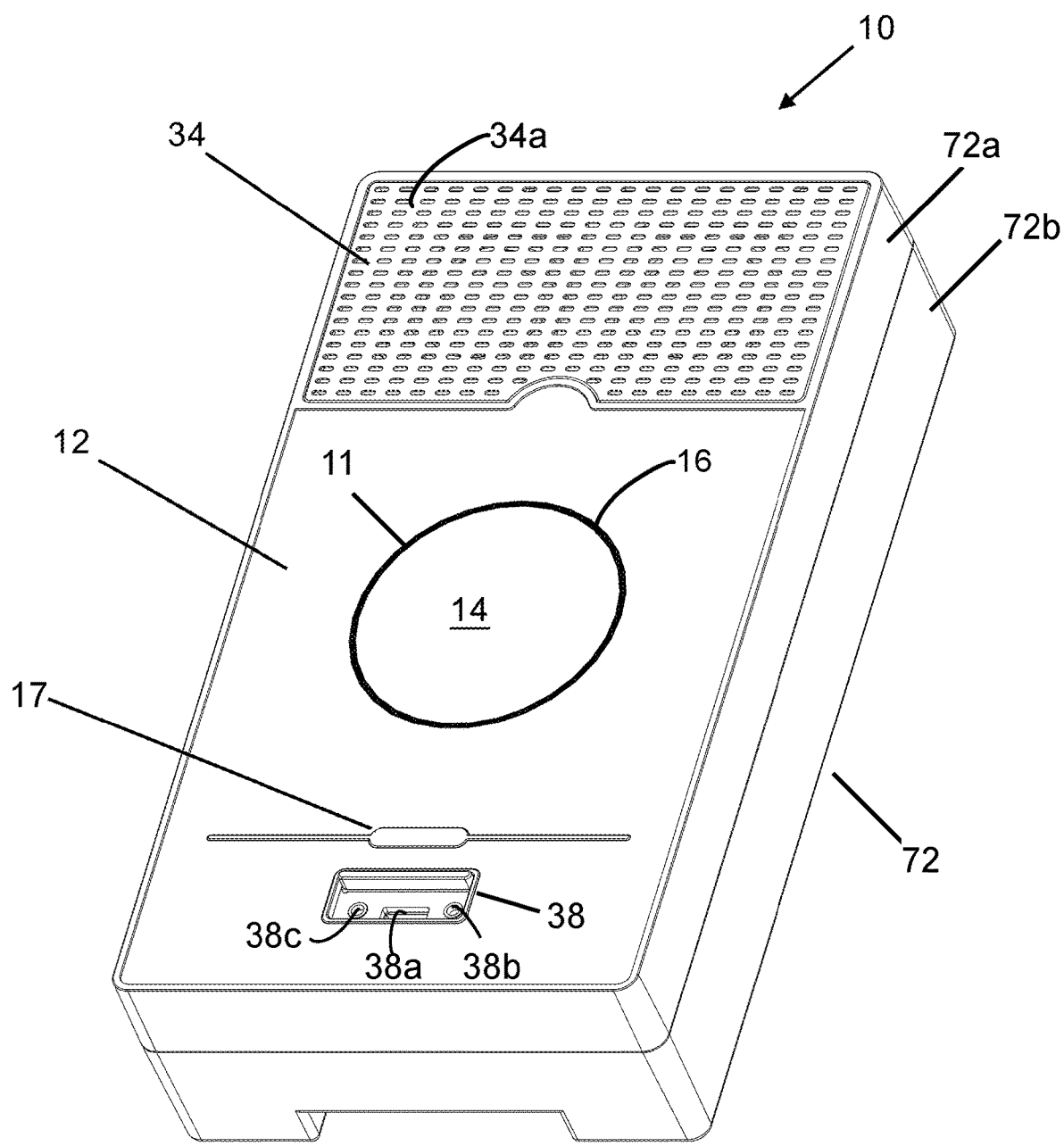
FIG. 1 is a perspective view of a multifunction control module according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

The exemplary embodiments relate generally to a multifunction control module with a movable cupholder section that may provide a flat surface when not in use and provide additional benefits such as allowing easier cleaning. In various aspects, the multifunction control module may provide additional functionality, such as wireless charging, audio speakers, Universal Serial Bus (USB) and other ports, and the like, via the tabletop surface. Thus, the exemplary embodiment(s) may provide a multifunction control module with various features and benefits, and efficient use of space. Reference will now be made in detail to various exemplary embodiments. Each example is provided by way of explanation and is not meant as a limitation and does not constitute a definition of all possible embodiments.

For purposes of this disclosure, the phrases "devices," "systems," and "methods" may be used either individually or in any combination referring without limitation to disclosed components, grouping, arrangements, steps, functions, or processes. Further, relative and/or spatial phrases such as "above", "below", "up" and "upwardly", "down" and "downwardly", and the like, are to aid in understanding the features and aspects, e.g., as shown in the drawings, of the exemplary embodiments, without limitation.

For purposes of illustrating features of the embodiments, an exemplary embodiment will now be introduced and referenced throughout the disclosure. This example is illustrative and not limiting and is provided for illustrating the exemplary features of a multifunction control module as described throughout this disclosure.

Figure 2:
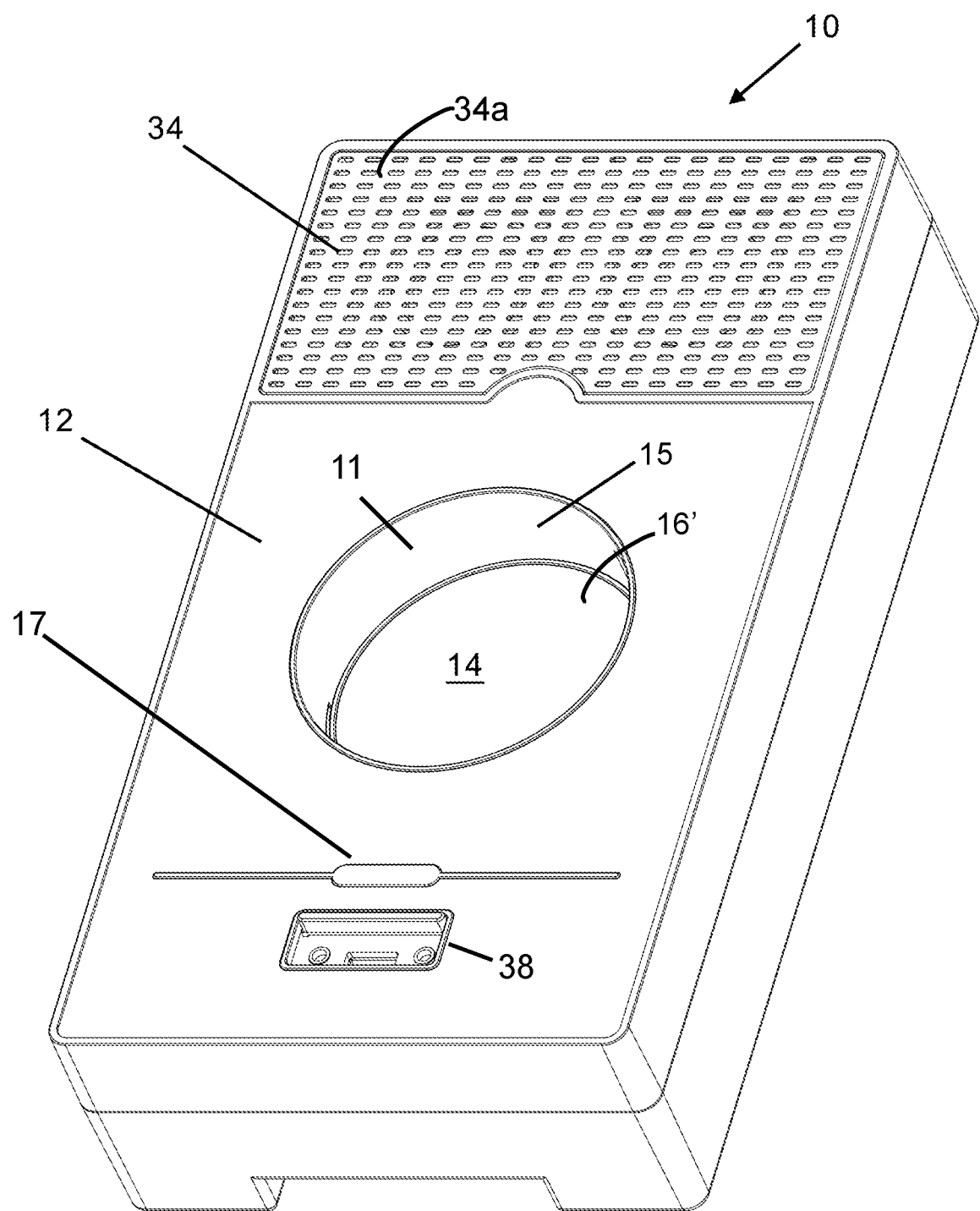
FIG. 2 is a further perspective view of a multifunction control module according to an exemplary embodiment.

With reference to FIG. 1 and FIG. 2, an exemplary embodiment of a multifunction control module 10 may include a housing 72 having a flat tabletop surface 12 on an upper side and a channel 16 defined by a sidewall 15 extending downwardly from an opening 11 through the flat tabletop surface 12. In an aspect, the sidewall 15 may be formed integrally with the flat tabletop surface 12 as a downwardly-projecting collar through which a void exists in the flat tabletop surface 12, thereby defining the opening 11. In other embodiments, the sidewall 15 may be a wall of a separate structure connected, joined, or secured to an underside (i.e., within the housing 72) of the flat tabletop surface 12, in alignment with the opening 11 which may be formed as an aperture through the flat tabletop surface 12. In still other embodiments, the sidewall 15 may include a portion integral to the flat tabletop surface 12 connected, joined, or secured to a wall of a separate structure, or other configuration consistent with this disclosure.

As shown in FIG. 1 and FIG. 2, the exemplary multifunction control module 10 includes a movable section 14 positioned within the channel 16. The movable section 14 may be movable within the channel 16, between a first position (as shown in FIG. 1) at which the movable section 14 is substantially planar with and thereby forms a part of the flat tabletop surface 12, and a second position (as shown in FIG. 2) at which the movable section 14 is below the flat tabletop surface 12 and a portion 16' of the channel 16 above the movable section 14 is open to the opening 11. For purposes of this disclosure, "substantially" means generally consistent with the spirit of the disclosure but without limitation to any particular measure. The movable section 14 is dimensioned to fit within the channel 16 and be movable relative to the sidewall 15 but in close enough proximity to, e.g., form in the first position a substantially continuous surface with the flat tabletop surface 12, and to prevent debris from falling between the movable section 14 and the sidewall 15, into an inside of the housing 72 in which controls are housed as discussed further below.

With reference to FIG. 2, the open portion 16' of the channel 16 above the movable section 14 in the second position may serve as, e.g., a cup holder—i.e., a user may put a cup in the open portion 16' of the channel 16 and the movable section 14 may serve as a bottom surface of the cup holder. The movable section 14 may be movable to various heights within the channel 16, to accommodate a variety of cups. The channel 16 may be any size or shape consistent with this disclosure, and a plurality of channels 16 may be similarly provided with a multifunction control module 10 according to the exemplary embodiments, dimensioned accordingly.

The movable section 14 may have a circularly-shaped profile (as shown in FIGS. 1 and 2). In other embodiments, the movable section 14 may have, for example and without limitation, a polygonal (e.g., octagonally-shaped) shape/profile, a rectangularly- or oval-shaped profile (not shown) (e.g., to function in the second position as a smartphone holder), or an inter-engaging profile such as a toothed pattern or a wave pattern (e.g., for an interesting design or specialized holder). As the movable section 14 and the sidewall 15 need only be adapted to one another, the movable section 14 and the channel 16 may correspondingly take any shape/profile and size consistent with this disclosure, as needs, applications, and preferences dictate.

In other aspects, the flat tabletop surface 12 may also include, e.g., ornamental or other surface features 17 or designs, and functional connections or componentry (as discussed further below) such as one or more auxiliary ports 38 and a speaker grate 34a through which a speaker 34 within the housing 72 may project audio. In an aspect, the surface feature 17 may include a logo or decorative design printed on or otherwise affixed to the tabletop surface 12.

Figure 4:
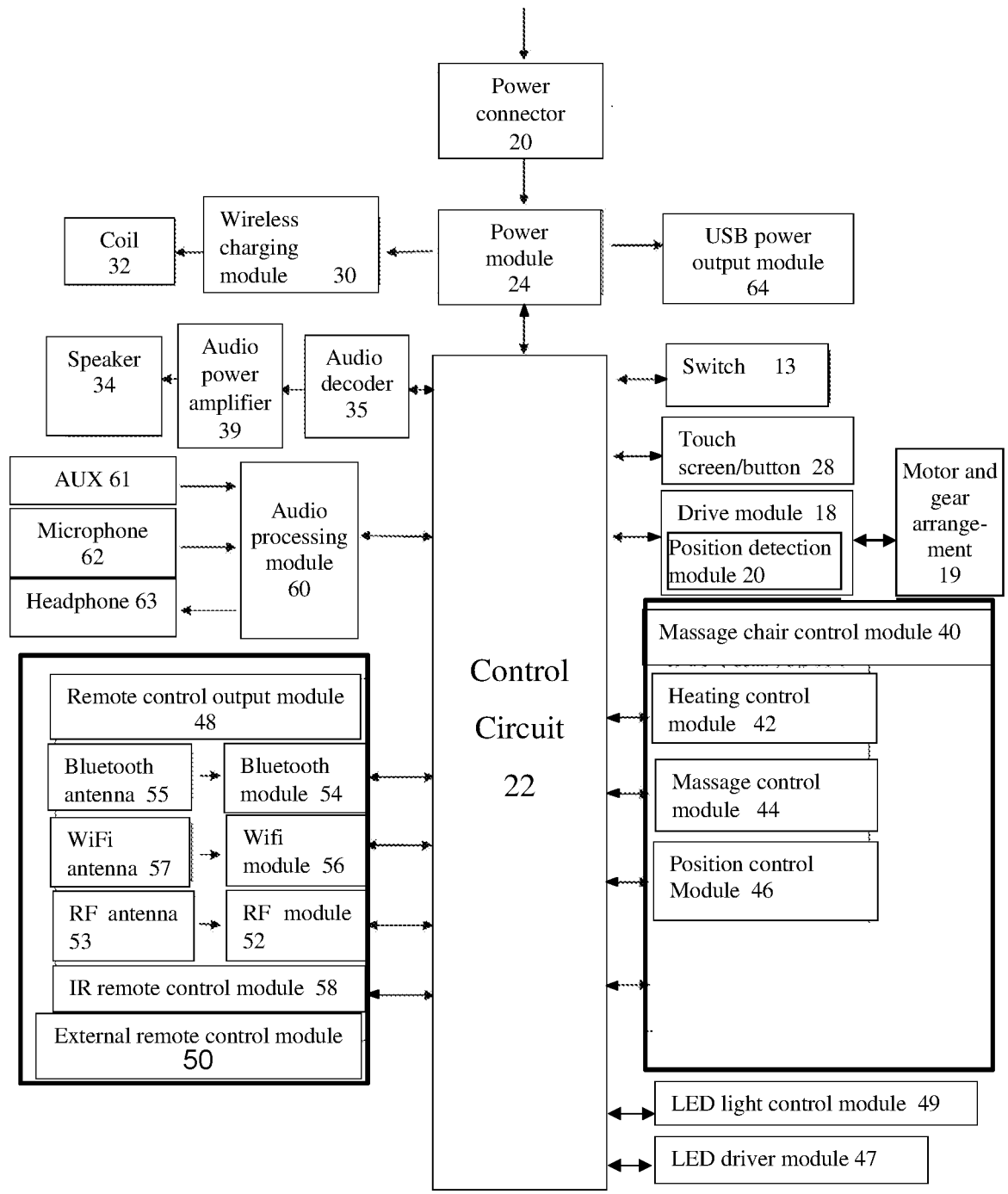
FIG. 4 is a block diagram of control circuitry for a multifunction control module according to an exemplary embodiment.

FIG. 4 shows a block diagram of exemplary control circuitry for a multifunction control module according to the disclosure. Unless otherwise specified, the control circuitry components may be any known components consistent with the disclosure, as would be readily understood by one of ordinary skill in the art in view of the disclosure. The control circuitry and componentry, including the various modules, drivers, and operative components (e.g., motor and gear arrangement 19, speaker 34, coil 32, etc.) as discussed below, may be within the housing 72. In an exemplary embodiment, without limitation, the housing 72 may include a top housing portion 72a and a bottom housing portion 72b joined together and enclosing the control circuitry and operative components. As shown in FIG. 4, without limitation, the control circuitry may further include a drive module 18 for controlling the movement of the moveable section 14 between the first position and the second position by a motor and gear arrangement 19, such as a direct current (DC) deceleration motor, a screw drive motor, or the like. In an aspect, the drive module 18 may include a position detection module 20 for measuring a position of the movable section 14. The position detection module 20 may incorporate any known components or techniques for determining position, consistent with this disclosure. For example, electrical, electromechanical, and optical sensors, and the like. Such sensor or position-determining component may be positioned generally at the bottom (i.e., corresponding to the second position of the movable section 14) of the channel 16.

According to a further aspect, the control circuitry may include a control circuit 22 for controlling various modules according to control circuitry for particular embodiments. The control circuit 22 may include a microcontroller unit (MCU) such as a 51 series single chip microcomputer, a TI series single chip microcomputer, an ARM series single chip microcomputer, and the like. It is understood that a "module" according to the diagram shown in FIG. 4 may include, without limitation, a portion of an actual control circuit, i.e., a module occupying a particular portion of a circuit board or other architecture on which the control circuit 22 is built and forming a part thereof. In the exemplary embodiment shown in FIG. 4, a power module 24 provides power for the control circuit 22, modules, and components. A power connector 20 such as a power plug or converter may be provided for connecting the power module 24 to an external power source (e.g., such as a power outlet or battery).

Figure 3:
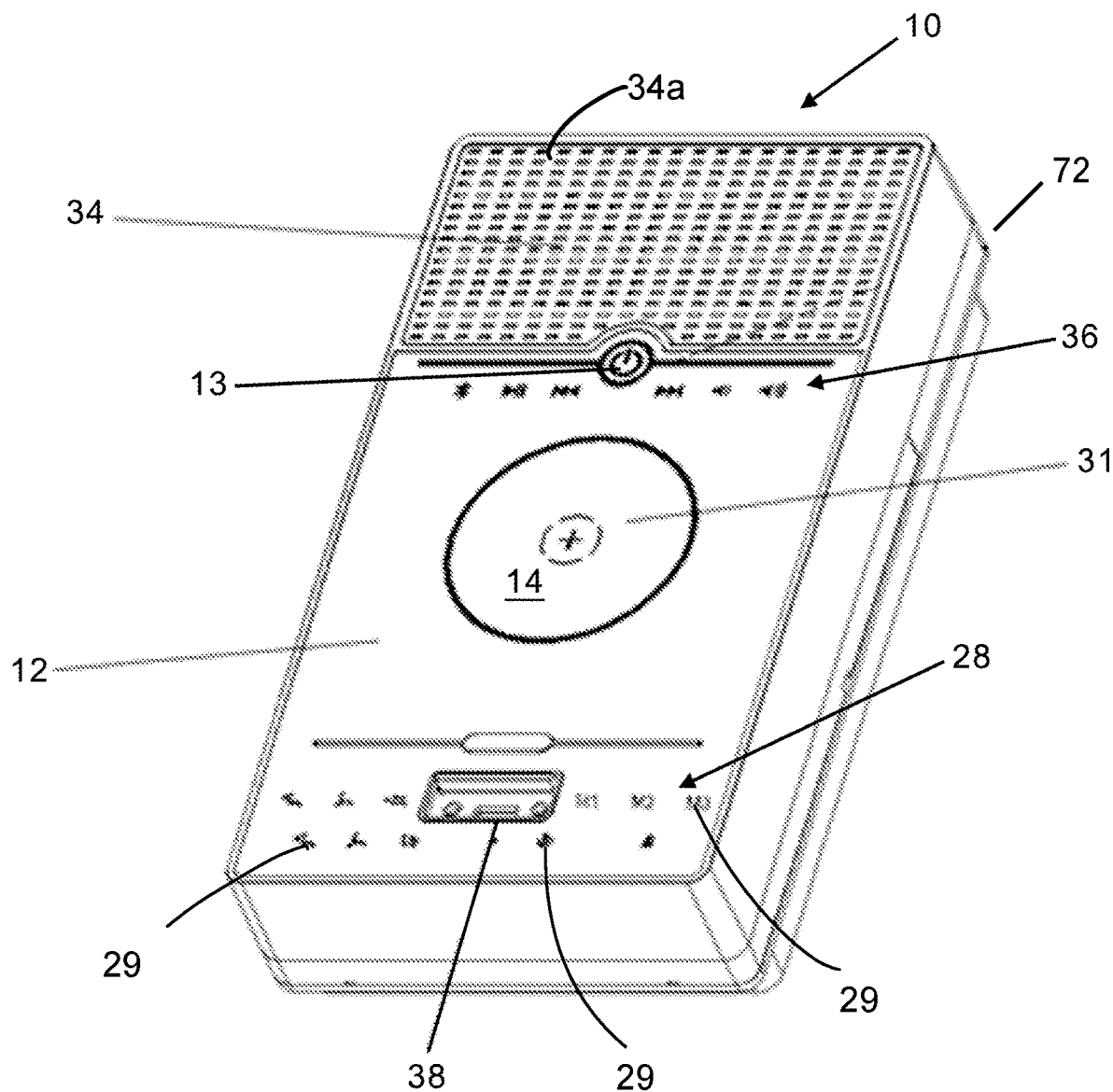
FIG. 3 is a perspective view of a multifunction control module according to an exemplary embodiment.

FIG. 3 shows a further exemplary embodiment of a multifunction control module 10. Common and/or consistent aspects of the exemplary embodiment(s) discussed with respect to FIGS. 1 and 2 are not necessarily repeated throughout the disclosure but understood as forming a part of each exemplary embodiment(s), unless otherwise indicated or inconsistent therewith. The exemplary embodiment shown in FIG. 3 includes, without limitation, an array 28 of touch buttons 29 that are connected to the control circuit 22 and positioned on or as integrated operable areas of the flat tabletop surface 12. The touch buttons 29 may communicate with various control circuitry for controlling functions of the multifunction control module 10.

For example, a corresponding touch button 29 may signal the drive module 18 to move the movable section 14. The touch button 29, upon actuation, may send a signal to the drive module 18 via the control circuit 22, and the drive module 18 may cause the motor of the motor and gear arrangement 19 to turn on, driving the gear in the direction indicated by the control signal. The movement of the movable section 14 may be sensed by the position detection module 20, which, in an aspect, may prevent movement of the movable section 14 beyond upper and lower limits (e.g., the upper limit may be co-planar with the top of the tabletop surface 12 and the lower limit may be a pre-set distance from, e.g., the position sensor at the bottom of the channel 16).

A switch 13 may be provided on the flat tabletop surface 12 for turning the multifunction control module 10 on and off. For example, the switch 13 may include a touch or push button, a contact switch, or a mechanical switch which is connected to or in communication with, e.g., the power module 24 and/or the control circuit 22, to control the power supply to, and thereby the on/off state of, the multifunction control module 10.

The control circuitry may further include a wireless charging module 30. The wireless charging module 30 may control a charging coil 32 that is integrated into the movable section 14, adjacent at a wireless charging region 31 of the movable section 14. The charging coil 32 may be located under the surface of the movable section 14 that is planar in the first position with the flat tabletop surface 12. Thus, the wireless charging region 31 of the movable section 14 may be used as a wireless charger for mobile electronics and the like. In other embodiments, the wireless charging region 31 may be located on any area of the flat tabletop surface 12—placement or arrangement of the charging region 31 is not limited to the movable section 14.

The multifunction control module may further include backlights for lighting features or regions of the flat tabletop surface 12, including, without limitation, the touch buttons 29, the wireless charging region 31, and audio touch controls 36 (as discussed further below). The backlights may aid in seeing operational areas in the dark. As shown in FIG. 4, a light-emitting diode (LED) driver module 47 and an LED light control module 49 may be provided for controlling operation and illumination levels of backlighting of the flat tabletop surface 12 (or other features in a like manner).

In an aspect, the audio touch controls 36 may be positioned on the flat tabletop surface 12 for controlling audio functions of the multifunction control module 10 and, e.g., an external audio device such as a smartphone or streaming device. In aspect, the audio touch controls 36 may include volume controls for the speaker 34. The control circuit 22 may include an audio decoder 35 and an audio power amplifier 37 for processing and projecting audio signals through the speaker 34.

The auxiliary port 38 disposed in the flat tabletop surface 12 may include one or more of various auxiliary connectors 38a, 38b, 38c, such as, without limitation, a ¾" jack, USB (/micro-USB/USB-C/etc.) port, and the like, for connecting to, charging, and/or communicating with external electronic devices. For example, headphones, a microphone, mobile electronics, and the like. In an aspect, the control circuitry may include an audio processing module 60 for transmitting to and/or receiving and processing signals from connected electronic devices, via, e.g., a general auxiliary device jack 61, a microphone jack 62, a headphone jack 63. In an aspect, a USB power output module 64 may be provided for charging an electronic device via the USB port (e.g., 38a). For example, an external device such as a smartphone or similar device may be connected to one of the ports 38a, 38b, 38c for charging the device and/or playing music via the speaker 34. In an aspect, one or more of the touch buttons 29 and/or audio control buttons 36 may be used to control certain functions of an external electronic device. For example, the audio control buttons 36 may include controls for selecting songs or tracks from a streaming media device.

The control circuit may also include one or more of various furniture control modules (e.g., massage chair control module 40) for controlling one or more of various functions of a furniture item—in an aspect, the furniture item may be a furniture item in which the multifunction control module 10 is installed, as discussed further below. The furniture item may be, without limitation, an electric recliner, chair, bed, or the like. In an aspect, the furniture control module 41 may control functions including, without limitation, heating, cooling, massage, position adjustment (e.g., angle of recline, raising or lowering of recliner footrest, adjustment of lumbar support), and the like. In the exemplary embodiment shown in FIG. 4, the massage chair control module 40 may be for a reclining massage chair with heating and cooling functions and may include a heating and cooling module 42, a massage control module 44, and a position control module 46.

The control circuitry may further include a remote-control output module 48. The remote-control output module 48 may be used to control devices, such as furniture modules, mobile electronics, smart home devices and appliances, and the like, having wireless control capabilities (i.e., Bluetooth, WiFi, radio frequency (RF), infrared (IR), and the like). Exemplary devices may be, without limitation, a television, home audio, a home heating or cooling system, a refrigerator, lighting, an alarm or security system, electronic windows and doors, furniture items such as discussed above, and other devices consistent with the disclosure. The respective exemplary remote-control output module 48 and external remote-control module 50 as shown in FIG. 4 include a respectively coupled RF module 52 and RF antenna 53, Bluetooth module 54 and Bluetooth antenna 55, and WiFi module 56 and WiFi antenna 57. The remote-control output module 48 further includes an IR remote control module 58. Each respectively coupled antenna-module pair receives and sends corresponding signals from/to an external device. For example, a smartphone may be connected to the Bluetooth module 54, via a Bluetooth connection through the Bluetooth antenna 55, for playing music via the speaker 34.

Figure 5:
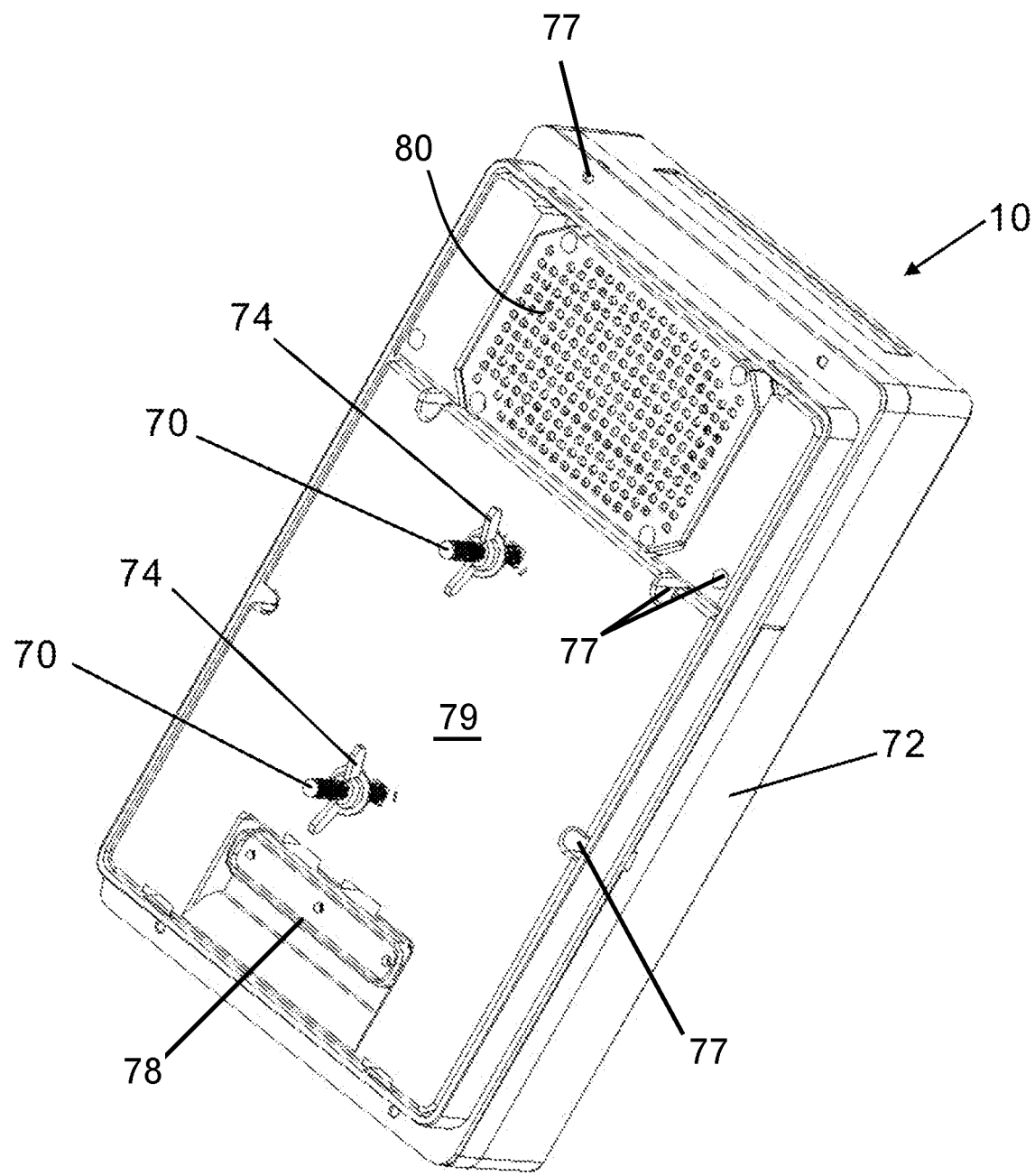
FIG. 5 is perspective view of a multifunction control module showing mounting hardware according to an exemplary embodiment.

With reference now to FIG. 5, an exemplary embodiment of the multifunction control module 10 includes mounting hardware 70, 74 for mounting the multifunction control module 10 to a piece of furniture, and other connections 77, 78 for joining and securing the housing portions 72a, 72b and internal components in position. The mounting hardware may include threaded rods 70 extending from a rear surface 79 of the housing 72, opposite the front tabletop surface 12, of the multifunction control module 10. The rear surface 79 may include other functional aspects of the multifunction control module 10, such as a vent 80 for exhausting heat generated by the control circuitry, motor(s), and other components within the housing 72.

The assembled multifunction control module 10 may be adapted to be fit into a recessed portion, scaffold, or other correspondingly configured portion of the furniture such that the threaded rods 70 pass through correspondingly formed holes in a structure of the furniture (such as a frame of an arm of a recliner) and are secured thereto by connecting respective threaded nuts 74 to the threaded rods 70.

In an aspect, the disclosure relates to a method for changing a configuration of a multifunction control module 10, according to the exemplary embodiment(s), including the housing 72 having the flat tabletop surface 12 on the upper side and the channel 16 defined by the sidewall 15 extending downwardly from the opening 11 through the flat tabletop surface 12. Further, the movable section 14 positioned within the channel 16 and movable between the first position forming the part of the flat tabletop surface 12 and the second position below the flat tabletop surface 12. The method may include controlling the movement of the moveable section 14 between the first position and the second position.

According to a further aspect, the disclosure relates to a method for providing a multifunction control module 10 according to the exemplary embodiment(s). The method may include providing the housing 72 having the flat tabletop surface 12 on the upper side and the channel 16 defined by the sidewall 15 extending downwardly from the opening 11 through the flat tabletop surface 12. The method may further include positioning a movable section 14 within the channel 16, such that the movable section 14 is movable within the channel 16 between a first position forming a part of the flat tabletop surface 12 and a second position below the flat tabletop surface 12.

According to an exemplary embodiment, a multifunction control module 10 as described above and throughout this disclosure includes the housing 72 having the flat tabletop surface 12 on the upper side, and the channel 16 defined by the sidewall 15 extending downwardly from the opening 11 through the flat tabletop surface 12. The movable section 14 is positioned within the channel 16 and movable within the channel 16 between the first position forming a part of the flat tabletop surface 12 and the second position below the flat tabletop surface 12. The exemplary multifunction control module 10 further includes the control circuit driver module 18 programmed for controlling movement of the movable section 14 between the first position and the second position.

The multifunction control module 10 according to the exemplary embodiments may provide central control of, among other things, various home and furniture functions, integrated wireless charging capabilities for external devices, and a flat tabletop surface and available cupholder in a space-saving configuration.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A multifunction control module, comprising:
   a housing having a flat tabletop surface on an upper side;
   a channel defined by a sidewall extending downwardly from an opening through the flat tabletop surface;
   a movable section positioned within the channel and movable within the channel between a first position forming a part of the flat tabletop surface and a second position below the flat tabletop surface;
   a drive module for controlling the movement of the movable section between the first position and the second position within the channel; and
   a wireless charging module,
   wherein the drive module comprises a position detection module for determining a position of the movable section,
   wherein the movable section includes the wireless charging module,
   wherein the wireless charging module comprises a wireless charging region positioned on the movable section, wherein the wireless charging region on the movable section is movable within the channel between the first position forming a part of the flat tabletop surface and the second position below the flat tabletop surface.

2. The multifunction control module in accordance with claim 1, wherein the drive module comprises one of a DC deceleration motor or a screw drive motor.

3. The multifunction control module in accordance with claim 1, further comprising:
   a control circuit for controlling the drive module; and
   a power module for powering the control circuit and the drive module.

4. The multifunction control module in accordance with claim 3, further comprising touch buttons in electrical communication with the control circuit and positioned on the flat tabletop surface for controlling the drive module, via the control circuit.

5. The multifunction control module in accordance with claim 1, further comprising a charging coil located under a surface of the movable section and in electrical communication with the wireless charging module.

6. The multifunction control module in accordance with claim 1, further comprising backlighting for lighting one or more of a touch button in the flat tabletop surface, a wireless charging region, and an audio touch control.

7. The multifunction control module in accordance with claim 1, further comprising:
   an audio touch control positioned on the flat tabletop surface.

8. The multifunction control module in accordance with claim 1, further comprising one or more auxiliary connectors disposed in the flat tabletop surface.

9. The multifunction control module in accordance with claim 1, further comprising:
   a control circuit comprising a control module for controlling a function of a furniture item or appliance.

10. The multifunction control module in accordance with claim 9, wherein the furniture function comprises one of heating, cooling, massage, and position adjustment.

11. The multifunction control module in accordance with claim 1, further comprising a remote-control output module, the remote-control output module comprising at least one of an RF module, a Bluetooth module, a WiFi module, and an InfraRed (IR) control module.

12. The multifunction control module in accordance with claim 1, further comprising an additional movable section positioned within an additional channel.

13. The multifunction control module in accordance with claim 1, wherein the movable section has a circularly-shaped profile.

14. The multifunction control module in accordance with claim 1, wherein the movable section in the second position and the sidewall together define a cup holder.

15. The multifunction control module in accordance with claim 1, wherein the position detection module is configured to prevent movement of the movable section beyond an upper limit and a lower limit.

* * * * *